(12) United States Patent
Diefenbaugh et al.

(10) Patent No.: US 9,832,521 B2
(45) Date of Patent: Nov. 28, 2017

(54) LATENCY AND EFFICIENCY FOR REMOTE DISPLAY OF NON-MEDIA CONTENT

(71) Applicant: Intel Corporation, Santa Clara, CA (US)

(72) Inventors: Paul S. Diefenbaugh, Portland, OR (US); Vallabhajosyula S. Somayazulu, Portland, OR (US); Yiting Liao, Hillsboro, OR (US); Krishnan Rajamani, San Diego, CA (US); Kristoffer D. Fleming, Chandler, AZ (US); James M. Holland, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 275 days.

(21) Appl. No.: 14/580,890

(22) Filed: Dec. 23, 2014

(65) Prior Publication Data
US 2016/0182946 A1   Jun. 23, 2016

(51) Int. Cl.
| G06K 9/36 | (2006.01) |
| H04N 21/4363 | (2011.01) |
| G06F 3/14 | (2006.01) |
| H04N 21/41 | (2011.01) |
| H04N 21/4402 | (2011.01) |
| H04N 21/235 | (2011.01) |
| H04N 19/156 | (2014.01) |

(52) U.S. Cl.
CPC ..... H04N 21/43637 (2013.01); G06F 3/1438 (2013.01); H04N 19/156 (2014.11); H04N 21/2355 (2013.01); H04N 21/4122 (2013.01); *H04N 21/440281* (2013.01); *G09G 2350/00* (2013.01); *G09G 2360/04* (2013.01); *G09G 2360/12* (2013.01); *G09G 2370/10* (2013.01); *G09G 2370/16* (2013.01)

(58) Field of Classification Search
None
See application file for complete search history.

(56) References Cited

U.S. PATENT DOCUMENTS

| 7,430,681 | B1 * | 9/2008 | Hobbs .................... H04L 69/28 713/400 |
| 8,254,704 | B2 | 8/2012 | Lu et al. |
| 8,806,360 | B2 * | 8/2014 | Cramer ................ G06F 3/0483 715/771 |
| 9,060,010 | B1 * | 6/2015 | McCusker ............. H04L 67/12 |

(Continued)

OTHER PUBLICATIONS

International Search Report and Written Opinion for International Patent Application No. PCT/US2015/061933, dated Mar. 3, 2016.

*Primary Examiner* — Andrae S Allison
(74) *Attorney, Agent, or Firm* — Green, Howard, & Mughal LLP

(57) ABSTRACT

Techniques related to encoding image content for transmission and display via a remote device with improved latency and efficiency are discussed. Such techniques may include skipping one or more of frame capture, encode, packetization, and transmission for a frame based on a skip indicator. One or more selective updates may be captured for the skipped frame and integrated into an encode of a subsequent non-skipped frame, which may be packetized and transmitted for to the remote device for presentment to a user.

25 Claims, 8 Drawing Sheets

(56) References Cited

U.S. PATENT DOCUMENTS

| | | | | |
|---|---|---|---|---|
| 9,294,533 | B2* | 3/2016 | Kasatani | H04L 65/4084 |
| 9,485,290 | B1* | 11/2016 | Kolomeitsev | H04L 65/60 |
| 2004/0010622 | A1* | 1/2004 | O'Neill | G06T 9/001 |
| | | | | 709/247 |
| 2004/0249980 | A1* | 12/2004 | Hutler | H04N 19/507 |
| | | | | 709/247 |
| 2007/0098276 | A1* | 5/2007 | Reese | H04N 19/91 |
| | | | | 382/234 |
| 2007/0268824 | A1* | 11/2007 | Kodaka | H04L 12/24 |
| | | | | 370/229 |
| 2008/0215671 | A1* | 9/2008 | Lu | G06F 3/1415 |
| | | | | 709/203 |
| 2011/0314093 | A1 | 12/2011 | Sheu et al. | |
| 2012/0005034 | A1 | 1/2012 | Jarman et al. | |
| 2014/0369421 | A1* | 12/2014 | Zhu | H04N 19/112 |
| | | | | 375/240.26 |

* cited by examiner

700

Skip one or more of Render, Capture, Encode, Packetize, or Transmission of a non-Media Content Portion of a Frame based on a Skip Indicator
701

↓

Capture one or more Selective Updates for the non-Media Content Portion of the Frame
702

↓

Integrate the Selective Update(s) into an Encode of a non-Media Content Portion of a Subsequent Frame
703

LATENCY AND EFFICIENCY FOR REMOTE DISPLAY OF NON-MEDIA CONTENT

BACKGROUND

Providing image content (e.g., media content or non-media content) from a mobile device to a remote display for presentment via wireless display technology is becoming increasingly popular. Supporting such wireless displays is difficult for small form factor mobile devices and may become even more so as higher resolution wireless displays (e.g., retinal quality displays) are implemented and as the mobile devices become thinner and lighter with tighter thermal constraints. Also, the wireless connection between the devices may become more and more congested as more devices are put in use. Furthermore, such wireless display support and other types of wireless input/output (IO) may increase as wireless usages including productivity applications, gaming, conferencing, and other difficult workloads become more mainstream.

In such environments, user experience including battery life, image quality, end-to-end latency, and the like will be difficult to maintain and improve. For example, in non-media environments (e.g., productivity, web browsing, and the like), human perception is acutely latency-biased. In such non-media environments, perceptual responsiveness (e.g. responsiveness to touch or other inputs) is important as is energy efficiency (e.g., to increase battery life). However, current wireless display solutions and/or specifications such as Wireless Display (WiDi) and/or Miracast may be optimized for media workloads such as video playback, photo viewing, and the like. For such media workloads, a constant frame rate may be advantageous and current solutions may seek to provide a constant frame rate at the expense of latency and/or energy efficiency problems.

More specifically, delays and bandwidth variations are inherent problems with wireless transports such as WiFi and WiGig. For example, delays on the order of 10 milliseconds (ms) may occur relatively frequently and even longer delays are not uncommon. Furthermore, even wired interfaces such as Ethernet and USB Bulk may provide non-trivial delays and bandwidth variations due to the shared nature of the transport. Also, use of non-deterministic transport in the context of an isochronous flow (e.g., wireless display) may accentuate such problems and/or provide additional problems. For example, if a source and target device in a wireless display setting or system operate natively at 60 Hz, a delayed frame (or failure to drop such a delayed frame) may make the target device lag one frame (e.g., 16.67 ms) behind the source device. Multiple such events may cause a significant lag with no way to recover without dropping frames. However, many wireless display encoding standards such the H.264/Advanced Video Coding (AVC) standard require the target device to decode all frames. Otherwise, the target device may miss data required for the decoding of subsequent frames. Furthermore, typical decoders may not be capable of decoding multiple frames per frame-time (e.g., typical decoders may decode a maximum of two frames per 16.67 ms interval), limiting the ability of the target device to catch up on significant delays. In any event, such delayed frames may not be displayed (e.g., at a 60 Hz target device) and therefore may not provide direct perceived user value.

As discussed, current wireless display solutions may focus on media workloads and some implementations may attempt to address the problem of delayed frames by implementing a large jitter buffer, which may add a fixed latency between the source device and the target device. Such a solution may be acceptable for media content (e.g., using a 100-200 ms buffer) where end-to-end latency is not a issue. However, such jitter buffer solutions are not typically acceptable for non-media and/or interactive workloads such as office productivity applications, gaming, web browsing, and many other applications that are typical in touch-screen interactions.

As such, existing techniques do not provide low latency and energy efficient wireless transmission of image content for remote display of non-media and/or interactive content. Such problems may become critical as the desire to present high quality image content that is responsive and can be generated with low power becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
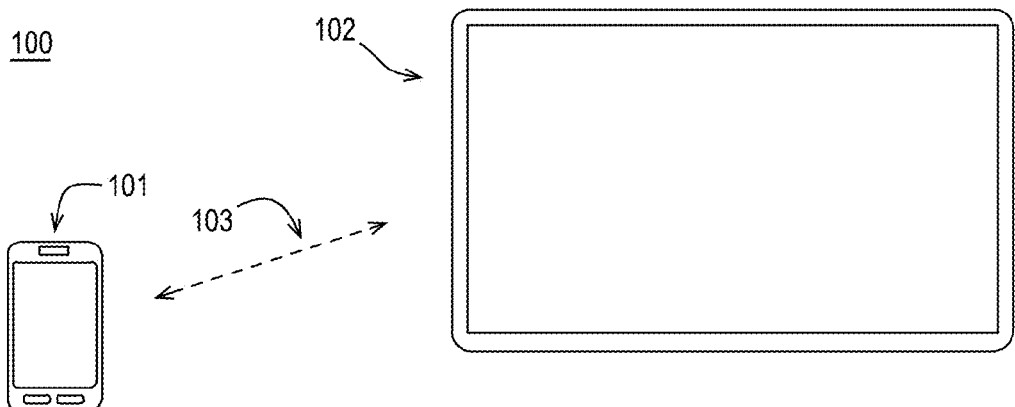
FIG. 1 is an illustrative diagram of an example system for remotely displaying image content.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to encoding image content for wireless transmission and, in particular, to skipping frame capture, encode, packetization, and/or transmission of a delayed frame and capturing selective updates of the delayed frame for integration into a subsequently encoded frame.

As described above, it may be advantageous to provide image content (e.g., media content or non-media content) from a mobile device to a remote device for presentment. For example, the image content may be encoded, packetized, and transmitted from a source device and received by a remote target device. The target device may decode the image content and present it via a display to a user. The image content may also be optionally presented via the source device. Furthermore, a user may interact with the image content via the source device (e.g., via a touch screen), the target device (e.g., via a touch screen), or another input device communicatively coupled to either or both of the source and target devices (e.g., a keyboard, mouse, gesture recognition device, etc.). As discussed, the user may be acutely aware of delays in such interactive environments.

For example, the image content may include media content or non-media content or both. Media content may include, for example, video playback or photo displays or the like. Non-media content may include interactive content, productivity application content, gaming content, or web browsing content, or the like. For example, non-media content may include word processing application content, document viewing application content, gaming content, web pages, or the like. Typically, users do not interact much or at all with media content and users do interact extensively with non-media content. As further described above, in the context of non-media content, low latency (e.g., responsiveness) and low battery usage may be important factors to the user's experience. However, typical wireless display solutions and/or specifications and video codecs may focus on constant frame rates for the presentment of media content. In particular, delayed frames or portions of frames may provide for undesirable latency in non-media content.

In some embodiments discussed herein, encoding image content for transmission and display via a remote device may include skipping one or more of frame capture, encode, packetization, and transmission of a non-media frame or a non-media content portion of a mixed non-media content and media content frame. For example, such skipping may be responsive to a skip indicator or signal generated based on a delay of a previous frame, transport delay or bandwidth variations, a power savings signal, or a power reduction signal, or the like. For example, frame skipping may be implemented in response to communications issues between the source and target devices or in response to the source device desiring to save power or reduce heat or the like. The embodiments discussed herein may further include capturing one or more selective updates for the non-media frame or non-media content portion of a frame that is being skipped. The selective updates may include regions having updates or changes from a frame prior to the frame to be skipped or the like. In other words, the selective updates are changes in image content including the pixel color or brightness values of the non-media portion of a frame. Furthermore, meta-data associated with the selective update(s) including an indicator of the frame and the location of the selective updates may be generated and retained.

Such frame skipping may be performed for one or more frames before a subsequent frame (e.g., a non-skipped frame) is to be processed for transmission. At the processing of the subsequent frame, the subsequent frame may be captured. The previously generated selective updates may be integrated into the encode of the captured subsequent frame. For example, the encoding of the subsequent frame may integrate or incorporate the selective updates. The encoded subsequent frame and selective updates may be packetized and transmitted to the remote device for decoding and presentment.

The embodiments discussed herein may provide for reduced processing at the source device as one or more of capture, encode, packetization, and transmission are skipped for the frame. Such operations may require intensive computational resources, time, and power and skipping one or more of them may save substantial resources and provide energy efficiency thereby optimizing the display pipeline. Furthermore, by not transmitting the skipped frame, latency problems are limited during bandwidth disruptions. Alternatively or in addition, such skipping techniques may reduce power usage and/or heat generation at the source device.

FIG. 1 is an illustrative diagram of an example system 100 for remotely displaying image content, arranged in accordance with at least some implementations of the present disclosure. As shown in FIG. 1, system 100 may include a source device 101 and a target device 102 communicatively coupled via a communications channel 103. In some examples, source device 101 may transmit, via communications channel 103, encoded image or video data to target device 102. Target device 102 may receive the encoded image or video data, decode it to generate image or video frames or the like, and present the decoded image content to a user via a display of target device 102. Although illustrated with a single source device 101 and a single target device 102 communicating via a single communications channel 103, any number or transmitting devices, receiving devices, and/or wireless communications channels may be employed in system 100.

Furthermore, a user may interact with source device 101, target device 102, or user input device(s) coupled to source device 101 and/or target device 102. For example, a user may interact with a touch screen or buttons or the like of source device 101, a touch screen or buttons or the like target device 102, an input device (e.g., a mouse, a keyboard, a gesture capture device, a camera, or the like) coupled to source device 101 and/or target device 102, or the like. Such user interactions may be captured as user input(s) via source device 101 or via target device 102 and such user input(s) may transmitted to source device 101. For example, such user input may be used by applications or the like of source device 101. Such applications or the like may utilize user input(s) in a wide variety of ways and, in some example, such user input(s) as implemented via applications or the like may modify rendered frames that are to be locally displayed via source device 101 and/or remotely displayed via target device 102.

In the illustrated example, source device 101 is a smartphone and target device 102 is a mounted display device. However, any combination of suitable devices may be implemented via system 100. For example, source device 101 may include any suitable device such as a computer, a laptop, an ultrabook, a smartphones, a tablet, or the like. Furthermore, target device 102 may include any suitable device such as a touch display, display glass, a television, a smart television, a mounted display device, a computer, a laptop, an ultrabook, a smartphone, a tablet, or the like. In some examples, target device 102 may be a set-top box or a digital recorder or the like. In such examples, target device 102 may not include a display, but target device 102 may be coupled to a display for presentment of image content. In any case, source device 101 and/or target device 102 may be described as computing devices herein. Furthermore, the image content transmitted from source device 101 to target device 102 may include any suitable image content such as non-media content and/or media content as discussed herein. In some examples, only target device 102 may present image content to users (e.g., a display of source device 101 may be off). In other examples, target device 102 and source device 101 may present the same content to a user or users and, in further examples, they may present different content.

In the illustrated example, communications channel 103 is a wireless communications channel. However, communications channel 103 may be any suitable wired or wireless communications channel or link that may be facilitated via any suitable protocol(s) or standard(s). In some examples, communications channel 103 is a WiFi connection based on an Institute of Electrical and Electronics Engineers (IEEE) 802.11 standard such as 802.11a/b/g/n/ac/ad or the like. In some examples, communications channel 103 is a WiGig connection based on a standard promulgated via the Wireless Gigabit Alliance of IEEE as the 802.11ad standard. In other examples, communications channel 103 may be based on an implementation of a WiFi Multimedia (WMM) interoperability standard. In yet further examples, communications channel 103 may provide communications based on wireless display (WiDi) technology and/or based on implementation of a wireless screen casting standard such as a Miracast standard using WiFi direction connections. In an embodiment, communications channel 103 is part of a wireless local area network (WLAN). In other examples, communications channel 103 may be a wired connection such as an Ethernet connection or a USB Bulk connection or the like.

As discussed herein, during connection problems or constraints of communications channel 103 and/or for power savings or heat reduction at source device 101, a portion of the processing of one or more frames (or portions thereof) at source device 101 may be skipped and selective updates may be captured for integration into the encode of a subsequent non-skipped frame. Techniques discussed herein may thereby reduce processing costs, battery usage, and heat generation at source device 101 and latency issues for users interacting with target device 102. For example, meaningful latency reduction for non-media content may be achieved by avoiding transmission by source device 101 and receiving and decoding by target device 102 of delayed frames (e.g., intermediate delayed frames) when transmission is delayed. Thereby, system 100 may be able to, via source device 101 and target device 102, quickly and dynamically respond once communication transport is reestablished via communications channel 103 without having to drop and/or process a large amount of frame data that, due to the delay, would not be presented to the user.

Figure 2:
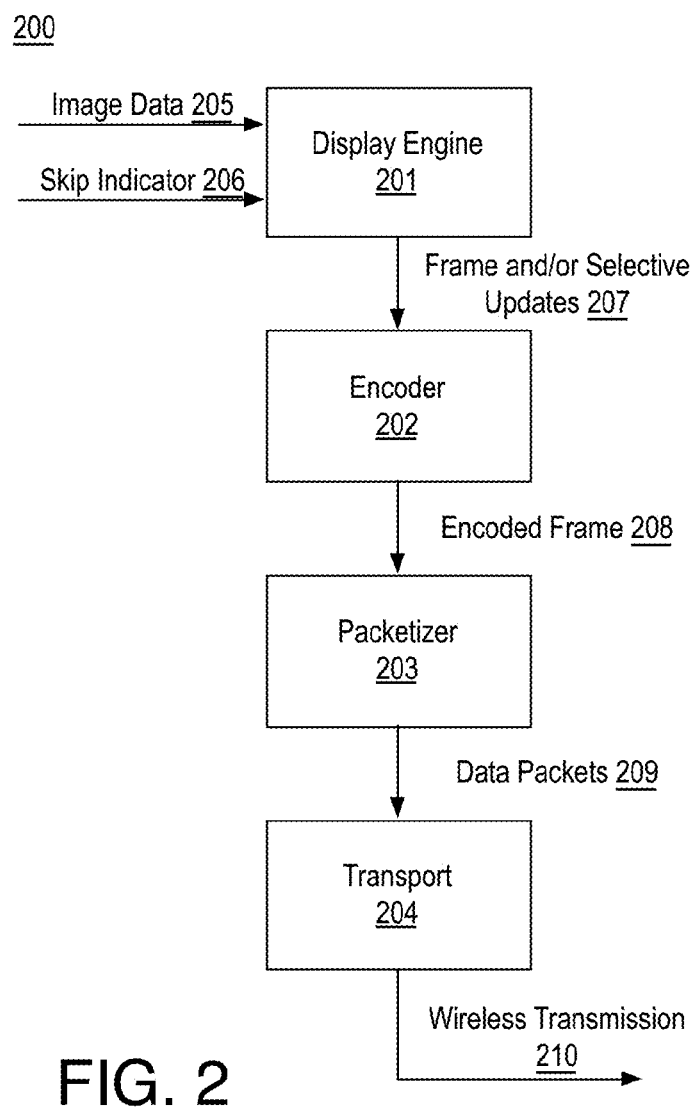
FIG. 2 illustrates an example system for encoding image content for wireless transmission.

FIG. 2 illustrates an example system 200 for encoding image content for wireless transmission, arranged in accordance with at least some implementations of the present disclosure. In some examples, system 200 may be implemented as a portion of source device 101. As shown in FIG. 2, system 200 may include a display engine 201, an encoder 202, a packetizer 203, and a transport module 204. As shown, system 200 may receive, obtain, or contain (e.g., via memory), image data 205. Also as shown, in some examples, system 200 may also receive, obtain, or contain a skip indicator 206. For example, image data 205 may be received from a rendering module implemented via a software stack of system 200. Image data 205 may include non-media data content for example. In some examples, image data 205 may include a non-media content frame or a data representation of a non-media content frame and, in other examples, image data 205 may include a non-media content portion (e.g., window, windows, or background) of a frame or a data representation of a non-media content portion of a frame. In such examples, the media portion of the frame (e.g., a window displaying video playback) may be processed using a constant frame rate and jitter buffer or the like. As is discussed further herein, in some examples, the rendering module (not shown) may also skip a render operation based on skip indicator 206.

Skip indicator 206 may provide any suitable indicator or signal that a frame of image content or a portion thereof is to be a skipped frame or skipped frame portion. In some examples, skip indicator 206 may be based on the transport of a previous frame (e.g., with respect to a current frame) being delayed (e.g. a transmission delay indicator) and/or a bandwidth limitation of the transport (e.g. a bandwidth limitation indicator). In such examples, skip indicator 206 may be received from transport module 204.

In other examples, skip indicator 206 may be based on a power savings indicator or a power or heat or thermal reduction indicator. In such examples, skip indicator 206 may be received from a power management unit or a thermal management unit, respectively, of system 200 (not shown in FIG. 2). For example, skip indicator 206 and implementation of the techniques discussed herein may allow for improved scaling when system 200 has a thermal or power constraint. For example, skip indicator 206, skipped frames, and selective updates as discussed herein may be implemented on a duty cycle basis such that they are implemented every second or third or Nth frame or even such that ever third, fourth or Nth frame is non-skipped, or the like to scale power consumption (e.g., by reducing capture, encode, packetization, and/or transmission operations associated with the skipped frame(s)) and the impact of such operations on the processor core(s) and main memory (not shown) of system 200 or other systems discussed herein. Such a duty cycle may be varied based on the desired power and heat savings and/or system indicators such as battery life remaining (e.g., if a battery life indicator indicates battery life less than a threshold more frames may be skipped) or temperature (e.g., if a temperature indicator is greater than a threshold more frames may be skipped). In some examples such duty cycling may be content sensitive. For example, as is discussed further herein, one or more regions or portions of a frame may have media content and one or more other regions or portions may have non-media content. In such examples, media and non-media regions may be duty cycled at different rates. For example, every other frame may be skipped for media (e.g., reducing frame rate from 60 frames per second to 30 frames per second) while non-media may be skipped at a higher rate (e.g., skipping 2 of every 3 frames or the like).

In the following discussion, system 200 is typically discussed on a frame basis such that the discussed frames may be non-media content frames as described herein. However, as discussed, in some examples, system 200 and the associated techniques may be applied to a portion or portions of a frame such as a non-media content portion(s) of a frame. Furthermore, such techniques are not limited to non-media content frames or portions thereof and such techniques may be applied to media content frames or portions thereof. However, such techniques may be advantageous for non-media content frames or portions thereof to provide low latency and enhanced user experience as discussed herein.

Continuing with FIG. 2, in examples where no skip indicator is received for a frame or frames (or a portion thereof), display engine 201 may receive image data 205 and display engine 201 may capture a frame associated with the image data. As shown, the frame may be transmitted (either directly or via memory as discussed further with respect to system 500) to encoder 202 via frame and/or selective updates data 207. In such examples, the non-skipped frame (or a portion thereof) may be encoded via encoder 202 and transmitted (either directly or via memory as discussed further with respect to system 500) to packetizer 203 via encoded frame data 208. Encoded frame data 208 may include any suitable encoded data such as encoded macroblocks (e.g., transformed and quantized coefficients representing macroblocks or residual macroblocks) or the like. Packetizer 203 may receive and packetize encoded frame data 208 to generate data packets 209. Data packets 209 may be transmitted (either directly or via memory as discussed further with respect to system 500) to transport module 204. Transport module 204 may receive and transmit data packets 209 to generate wireless transmission 210. Wireless transmission may be carried via a communications channel (such as communications channel 103) to a remote device, which may de-packetize, decode, and present image data to a user via a display of the remote device.

Such processing may be repeated for any number of non-skipped frames (or a portion thereof). In some examples, such processing may continue when the communications channel is not constrained and/or when system 200 does not have power savings or heat constraints.

In examples where skip indicator 206 is received for a frame (or a portion thereof), system 200 may skip one or more of frame capture via display engine 201, encode via encoder 202, packetization via packetizer 203, and/or transmission via transport module 204. For example, skip indicator 206 may be received for a frame (or a portion thereof) via display engine 201. In such examples, for the frame (or a portion thereof) that is to be skipped or dropped or non-transmitted, display engine 201 may capture one or more selective updates for the frame based on image data 205. The selective updates may include changes or updates from a previous frame (either skipped or non-skipped). For example, display engine 201 may process image data 205 to determine selective updates for the current frame (e.g., the frame to be skipped). The selective updates may be stored (e.g., via local cache or the like) and transmitted to encoder 202 via frame and/or selective updates data 207 with a subsequent non-skipped frame. For example, selective update(s) may be captured and stored for one or more skipped frames. When a frame is non-skipped, display engine 201 may capture a frame as discussed above and transmit the non-skipped frame and the selective update(s) to encoder 202.

For example, for the skipped frames or frame portions, no data or indicators may be provided to encoder 202 and the illustrated display pipeline (e.g., including display engine 201, encoder 202, packetizer 203, and transport module 204 may not further process the skipped frame or frame portion. Such skipping may include skipping at least encode, packetization, and transmission of the skipped frame, which may in turn save power, reduce heat production, and improve latency as discussed herein. Furthermore, for the skipped frames (or portions thereof), frame capture may also optionally be skipped or partially skipped. In some examples, the skipped frame may not be written to the frame buffer (as illustrated with respect to system 500). In other examples, the skipped frame may be partially written to the frame buffer such that the portion of the frame associated with the selective update(s) are written to the frame buffer. In such examples, it may not be possible to write only the portion of the frame associated with the selective update(s) and, for example, complete scan lines or other portions of the frame including the selective updates may be written to the frame buffer. In still other examples, the entire frame may be written to the frame buffer.

In addition to the selective update(s), meta-data associated with the selective update(s) may also be generated via display engine 201 and transmitted to encoder 202. Such meta-data may include an indicator (e.g., frame number or the like) of the skipped frame associated with a particular selective update, a location or size of the selective update, or the like. Such meta-data may be transmitted to encoder 202 such that encoder 202 may integrate the selective update(s) when encoding the first non-skipped frame (or a portion thereof). For example, encoder 202 may encode the non-skipped frame itself and the selective update(s) via the encode. Such encoding may also utilize reference frames as is discussed further herein with respect to system 500. Such encoded frame data 208 (e.g., encoded frames integrating selective update(s)) may be transmitted (either directly or via memory) to packetizer 203 via encoded frame data 208. Packetizer 203 may receive and packetize encoded frame data 208 to generate data packets 209, which may be transmitted (either directly or via memory) to transport module 204. Transport module 204 may receive and transmit data packets 209 to generate wireless transmission 210. Wireless transmission may be carried via a communications channel (such as communications channel 103) to a remote device, which may de-packetize, decode, and present image data to a user via a display of the remote device.

Using such techniques, non-skipped frames may be transmitted from system 200 as wireless transmission 210. Such non-skipped frames may or may not include selective updates as discussed herein. In any event, a receiving remote device such as target device 102 may receive wireless transmission 210. Target device 102 may de-packetize wireless transmission to generate encoded frame data, decode the encoded frame data to generate frames, and present the frames to a user via a display device, for example. As discussed, the described techniques may reduce latency by eliminating receive and decode via target device 102 of delayed frames. The described techniques may, in some examples, skip or drop such delayed frames at system 200 as discussed. Such techniques may provide little or no latency (e.g., less than 30 ms end-to-end display latency) for a remote display system.

As discussed, techniques described with respect to system 200 may reduce end-to-end latency between a source device and a target device. Such latency reduction may be based on a disruption of a communications channel, which may delay transmission of packets across the communications channel.

Figure 3:
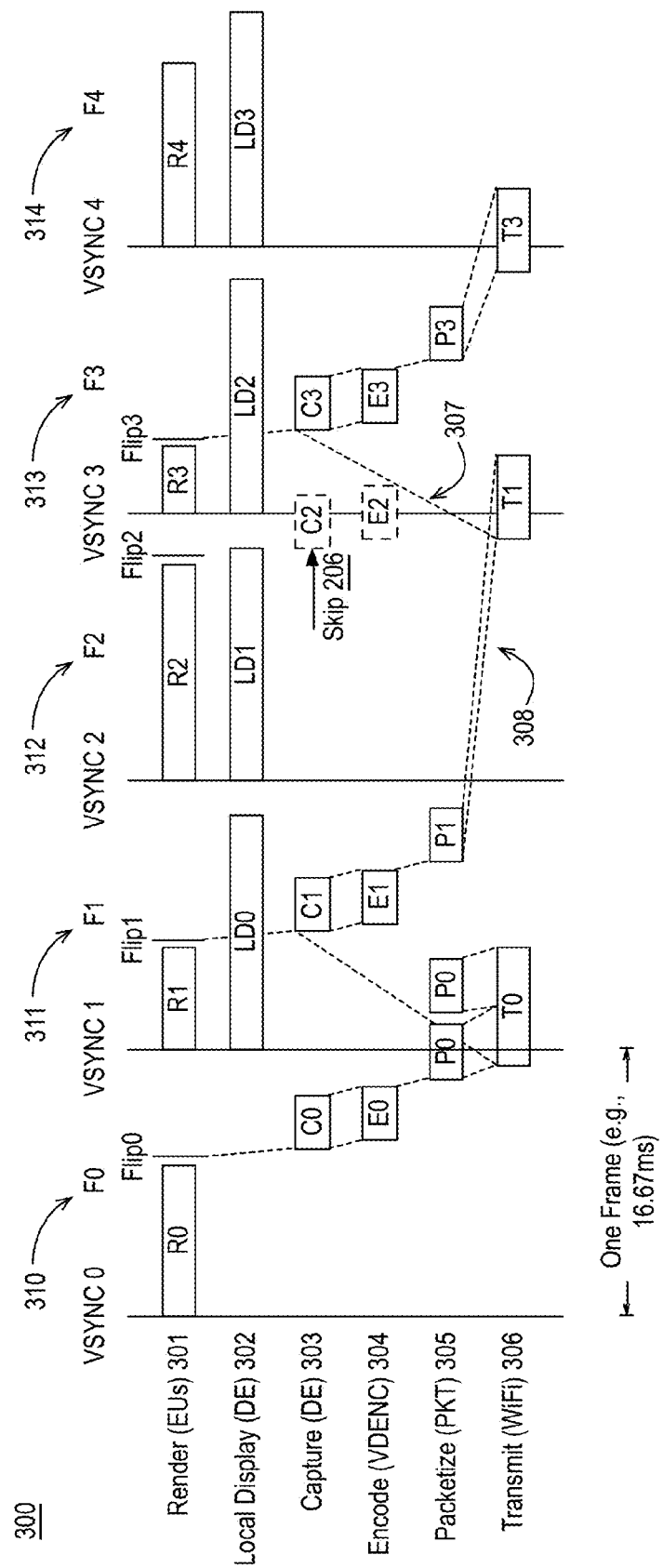
FIG. 3 is an example timing diagram illustrating example frame capture, encode, packetization, and transmit skipping.

FIG. 3 is an example timing diagram 300 illustrating example frame capture, encode, packetization, and transmit skipping, arranged in accordance with at least some implementations of the present disclosure. As shown in FIG. 3, timing diagram 300 illustrates render operations 301 (e.g., R0, R1, R2, R3, R4), local display operations 302 (e.g., LD0, LD1, LD2, LD3), capture operations 303 (e.g., C0, C1, C2, C3) including skipped capture operation C2, encode operations 304 (e.g., E0, E1, E2, E3) including skipped encode operation E2, packetize or packetization operations 305 (e.g., P0, P1, P3) with skipped packetize operation P2 not shown, and transmit operations 306 (e.g., T0, T1, T3) with skipped transmit operation T2 not shown. Skipped capture operation C2 and skipped encode operation E2 are illustrated via dashed lines. As discussed, at skipped capture operation C2 frame capture may be skipped and one or more selective updates and, optionally, meta-data associated with the selective update(s) may be captured Timing diagram 300 also illustrates associations or signals, many of which are not labeled for the sake of clarity of presentation, such as signal 307 via dashed lines extending between operations.

Timing diagram 300 illustrates operations associated with frames 310, 311, 312, 313, 314 (also labeled as frames F0, F1, F2, F3, F4). Frames 310, 311, 312, 313, 314 may have any duration (and associated refresh rates) such as a duration of 16.67 ms, as shown. In timing diagram 300 operations are numbered with respect to their associated frame (e.g., E1 is an encode operation for frame F1 311, P2 is a packetize operation for frame F2 312, and so on). Timing diagram 300 also illustrates vertical synchronization (VSYNC) operations VSYNC 0, 1, 2, 3, 4 and flip operations Flip0, Flip1, Flip2, Flip3, Flip4. Flip operations may provide a signal for the begin of capture as shown with respect to capture operations C0, C1, C3.

As shown with respect to frame F0 310, for a non-skipped frame (or a portion thereof), a system such as any system discussed herein may render image data for the frame via render operation R0. As shown, in some examples, render operations 301 may be implemented via execution units (EUs) of the system. After the completion of render operation R0, a Flip0 operation may indicate or signal the start of capture operation C0. For example, capture operations 303 may be implemented via a display engine (DE) such as display engine 201. After the start of capture operation C0, encode operation E0 may begin. For example, encode operations 304 may be implemented via a video encoder (VDENC) such as encoder 202. As shown, in some examples, capture operation C0 and encode operation E0 may be performed at least partially simultaneously. As shown, subsequent to the finish of encode operation E0, packetize operations P0 (e.g., formation of one or more packets and in this example, formation of two packets) may be performed. For example, packetize operations 305 may be implemented via a packetizer (PKT) such as packetizer 203. After the begin of packetize operations P0, transmit operation T0 may also begin. For example, transmit operations 306 may be implemented via a transport module such as transport module 204. As shown, in some examples, transmit operations 306 may be implemented via WiFi. Also as shown, in some examples, packetize operations P0 and transmit operation T0 may be performed at least partially simultaneously.

In the example of frame F0 310, no skipping may have been implemented. As shown, a substantially serial process with overlap of render operation 301, capture operation 303, encode operation 304, packetize operation 305, and transmit operation 306 may be implemented for frame F0 310 (or a portion thereof) to provide image data from a source device such as source device 101 to a target device such as target device 102 (please refer to FIG. 1).

Continuing with frame F1 311, such operations may be substantially repeated at render operation R1, flip operation Flip1, capture operation C1, encode operation E1, and packetize operation P1. Furthermore, timing diagram 300 illustrates local display operation LD0 associated with frame F0 310. For example, local display operations may be performed via a display engine such as display engine 201 to optionally locally display frame F0 310 at a source device such as source device 101. Returning to frame F1 311, as shown, between packetize operation P1 and transmit operation T1, a delay 308 may occur. In the illustrated example, the delay is about one frame duration or 17 ms but any duration of delay may occur. As shown, based on delay 308, skip indicator 206 may be generated or implemented. Skip indicator 206 may indicate frame F2 312 (e.g., the frame subsequent to the delayed frame) is to be a skip frame. For example, skip indicator 206 may be based on a monitoring of delay 308 such that a delay over a threshold may cause skip indicator 206 to be generated and implemented. In another example, skip indicator 206 may be always on and may only be switched off by the implementation or start of transmission operation T1. In some examples, skip indicator 206 may negate a start signal provided by flip operation Flip2. As discussed, in other examples, skip indicator 206 may be implemented based on an overall status of a communications link, a power basis, or thermal management basis and not solely on the basis of delay 308.

As shown with respect to frame F2 312, a render operation R2 may be performed to generate image data. Furthermore, timing diagram 300 illustrates local display operation LD1 associated with frame F1 311. As shown via dashed lines, capture operation C2 may be skipped or at least partially skipped in response to or based on skip indicator 206. For example, one or more selective updates to frame F2 312 may be captured for frame F2 312 (or a portion thereof). In some examples, frame F2 312 may be a non-media frame. In some examples, a region or portion of frame F2 312 may be a non-media region or portion. As is further shown in timing diagram 300, encode operation E2 may be skipped (as shown via dashed lines), packetize operation P2 (not shown) may be skipped, and transmit operation T2 (not shown) may be skipped. For example, the techniques discussed herein may provide fine grain control in the display pipeline (e.g., capture, encode, packetization, and transmission) to reduce power, heat, and system latency.

Continuing with frame F3 313, render operation R3 and flip operation Flip3 may be performed as discussed for frame F3 313 (or a portion thereof). As shown, signal 307 may be provided at the begin of transmission operation T1. Signal 307 may be provided to initiate capture operation C3 such that frame F3 313 is a non-skipped frame. For example, signal 307 may be too late to initiate capture operation C2 but early enough to initiate capture operation C3. For example, capture operation C2 (e.g., for a current frame) may be scheduled for immediately after Flip2 operation and transmission operation T1 (e.g., for a previous frame) may be delayed or occur after the scheduled capture operation C2. Capture operation C3 may be performed as discussed above. As shown, at the start of capture operation C3, a signal may be provided to start encode operation E3. Encode operation E3 may encode frame F3 313 and selective update(s) from frame F2 312. For example, such selective updates may be integrated into the encode of frame F3 313 as discussed herein. For example, such selective updates may modify or provide a modification to the encoding of frame F3 313. As shown, after completion of encode operation E3 a signal may be provided to begin packetize operation P3 and the packetized information may be transmitted at transmission operation T3. Processing may continue as discussed for frame F4 314 and subsequent frames.

In the illustrated example, a single frame (e.g., frame F2 312) is skipped (e.g., at least encode, packetization, and transmission are skipped and in this example capture is also skipped). However, any number of consecutive frames such as two, three, or more consecutive frames may be skipped as delay 308 increases. For example, for a frame immediately subsequent to a skipped frame encode, packetization, and transmission of the immediately subsequent frame may also be skipped and one or more selective updates for the immediately subsequent frame may be captured and integrated into the encode of the first non-skipped frame. Such skipping may be indicated via skip indicator 206 and/or via additional skip indicators.

Figure 4:
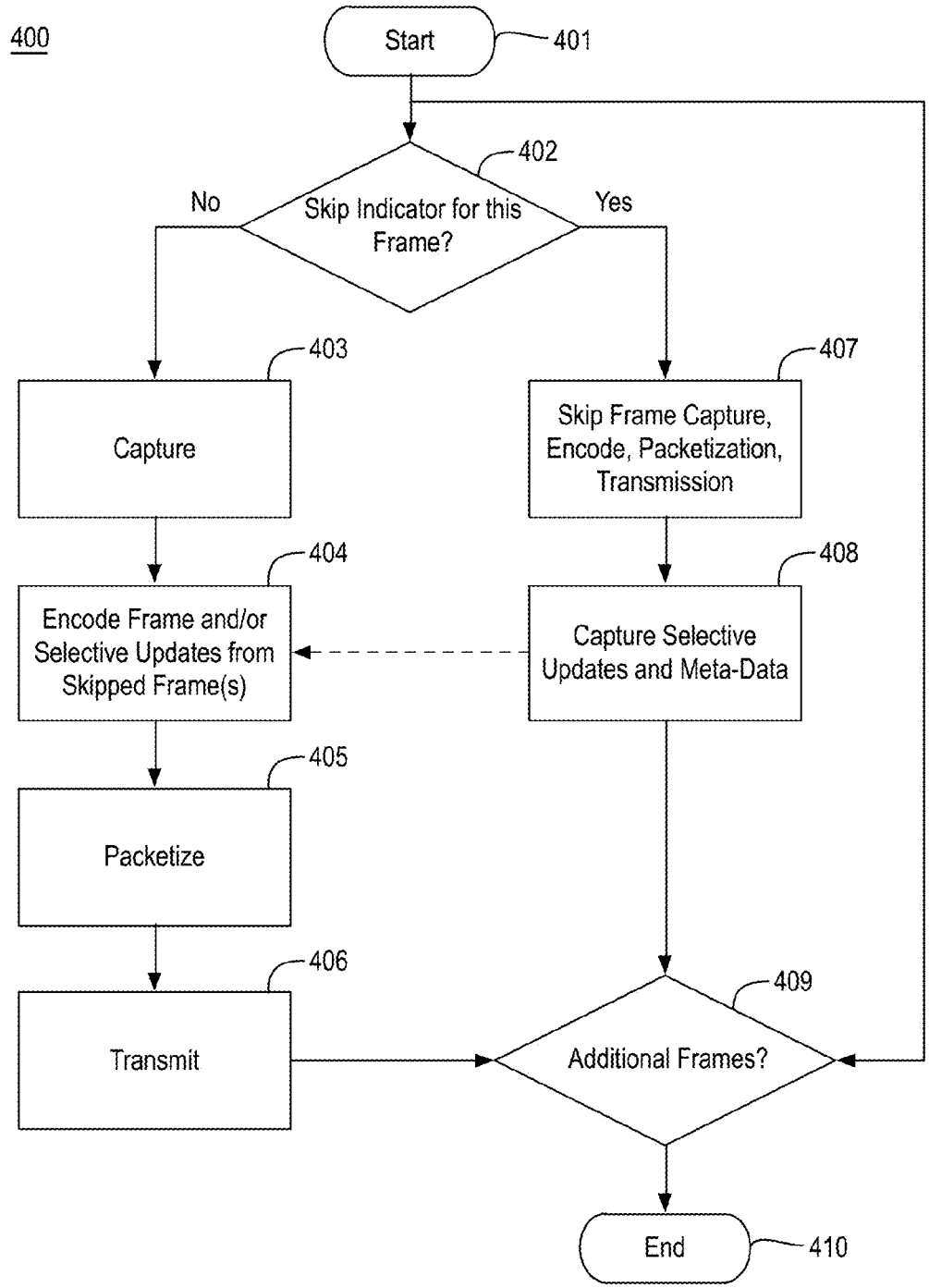
FIG. 4 is a flow diagram illustrating an example process for encoding image content for transmission and display via a remote device.

FIG. 4 is a flow diagram illustrating an example process 400 for encoding image content for transmission and display via a remote device, arranged in accordance with at least some implementations of the present disclosure. Process 400 may include one or more operations 401-410 as illustrated in FIG. 4. Process 400 may form at least part of an image content encoding process implemented via, for example, a display pipeline. By way of non-limiting example, process 400 may form at least part of a video encoding process video content as undertaken by source device 101, device 1000, or systems 200, 500, 800, or 900 as discussed herein.

In some examples, process 400 may be implemented when a communications channel is having capacity problems, packet dropping problems, or is otherwise a bottleneck. In other examples, process 400 may be implemented during a power savings or thermal savings mode of a device. As shown in FIG. 4, process 400 may begin from start operation 401 at decision operation 402, "Skip Indicator for this Frame?", where a determination may be made as to whether a skip indicator is associated with the current frame. As discussed, the skip indicator may include a transmission delay indicator, a bandwidth limitation indicator, a power savings indicator, a thermal reduction indicator, or the like. For example, a transmission delay indicator or a bandwidth limitation indicator may be generated via packetizer 203 and/or transport module 204 based on a delay of packet transmission, backpressure, feedback from transport module 204, or the like. In some examples, packetizer 203 or other logic (e.g., controller logic or the like) may make a prediction to generate skip indicator 206 as a signal to skip or defer capture, encode and etc. of a frame.

As discussed, in some examples, such a skip indicator may be associated with an entire frame. In other examples, such as examples with region(s) of media content and region(s) of non-media content such a skip indicator may indicate a skip or defer of capture, encode, etc. of selective region(s) of the frame. In some examples, skip indicator 206 may be generated to skip/defer non-media region(s). Such processing may be characterized as selective region processing such that region(s) of frame(s) are selectively skipped/deferred while other region(s) may be processed using standard techniques. For example, media content may be processed without skip/deferral processing.

As shown, if no skip indicator is associated with the current frame, process 400 may continue at operation 403, "Capture", where a frame capture may be performed for the current frame. For example, a frame capture may be performed via display engine 201 on image data 205 to generate frame data.

Processing may continue from operation 403 at operation 404, "Encode Frame and/or Selective Updates from Skipped Frame(s)", where the current frame and any selective updates from skipped frame(s) may be encoded. If no selective updates are provided (e.g., based on prior skipped frames) from operation 408 (as discussed further below), the current frame may be encoded without selective updates. If selective update(s) are provided from operation 408, the current frame may be encoded such that the encoding integrates the selective update(s) into the encode. Operation 404 may be performed using any suitable video codec such as H.264/AVC, the High Efficiency Video Coding (HEVC)/H.265 video coding standard, VP9, MPEG-2, or the like. For example, the techniques discussed herein may leverage codec and bit-stream scalability inherent in such video codecs and video coding standards to provide low latency and energy efficiency as discussed herein.

Processing may continue from operation 404 at operation 405, "Packetize", where the encode of the current frame (and any selective updates) may be packetized as discussed herein. For example, encoded frame data 208 may be packetized via packetizer 203 to generate data packets 209. Such packetization may be performed using any suitable technique or techniques and the resultant packets may include any suitable data structure such as a control information and payload data structure.

Processing may continue from operation 405 at operation 406, "Transmit", where the packetized encoded frame data may be transmitted. For example, transport module 204 may transmit data packets 209 to generate wireless transmission 210. Such a wireless transmission may be carried via a communications channel to a remote device. Although discussed with respect to wireless transmission, operation 406 may, in some examples, implement a wired transmission.

As discussed, at decision operation 402, "Skip Indicator for this Frame?", a determination may be made as to whether a skip indicator is associated with the current frame. If a skip indicator is associated with the current frame, process 400 may continue at operation 407, "Skip Frame Capture, Encode, Packetization, Transmission", where one or more of frame capture, encode, packetization, an transmission may be skipped for the current frame as discussed herein. Processing may continue from operation 407 at operation 408, "Capture Selective Updates and Meta-Data", where selective updates and, optionally, meta-data may be captured for the current frame as discussed herein. As shown, such selective updates and, optionally, meta-data may be provided to operation 404 for processing of a subsequent (non-skipped) frame as discussed. For example, operation 404 may be performed on a first non-skipped frame after one or more frames are skipped and any selective updates associated with the skipped frames may be integrated into the encode of the non-skipped frame as discussed.

As shown, processing may continue from operation 406 or operation 408 at decision operation 409, "Additional Frames", where a determination may be made as to whether there are additional frames or image content data to process. If so, process 400 may continue as discussed at decision operation 402. If not, process 400 may end at end operation 410.

The operations of process 400 may be repeated any number of times either in series or in parallel for any image content such as non-media frames or non-media regions of frames.

Figure 5:
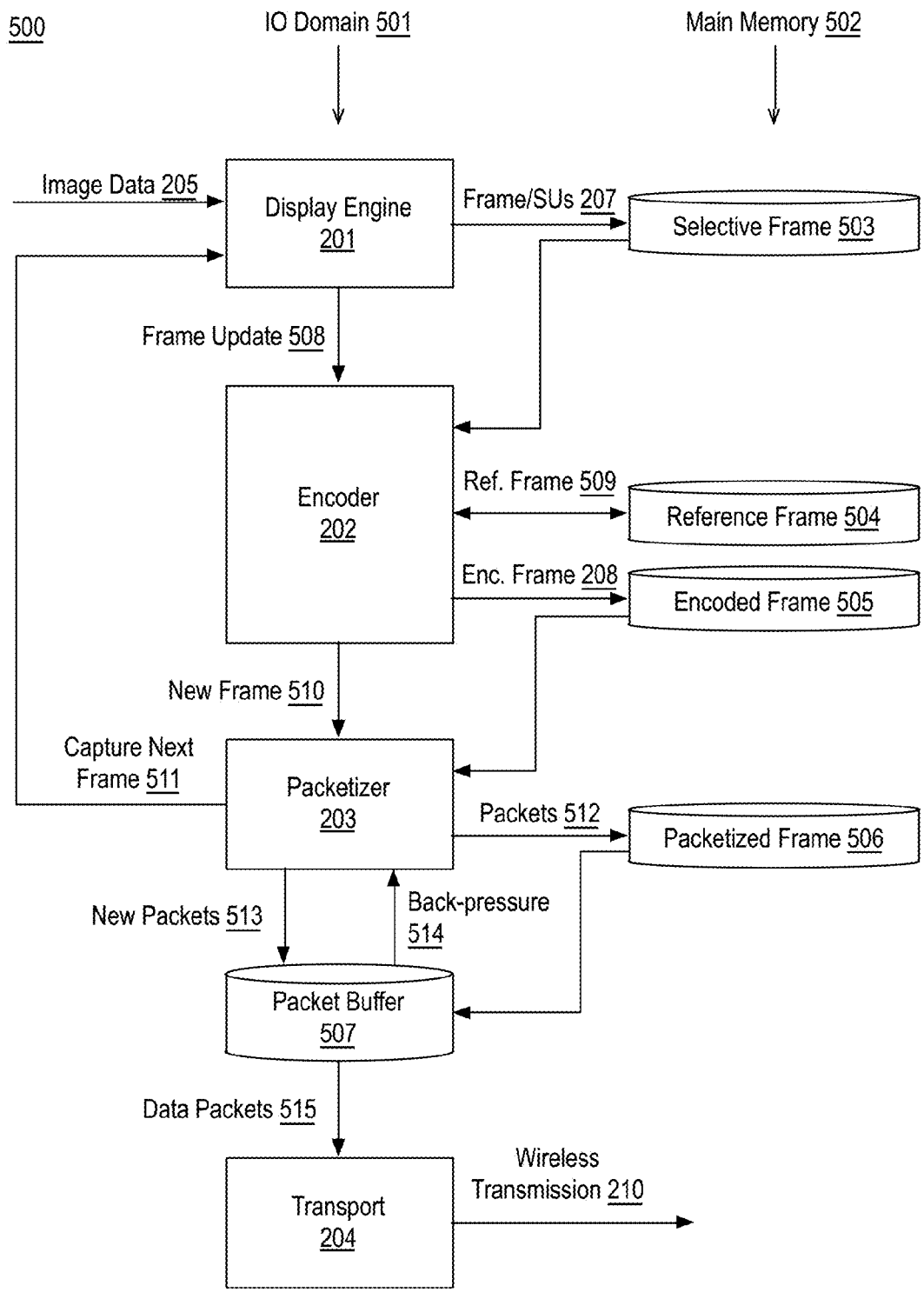
FIG. 5 illustrates an example system for encoding image content for wireless transmission.

FIG. 5 illustrates an example system 500 for encoding image content for wireless transmission, arranged in accordance with at least some implementations of the present disclosure. In some examples, system 500 may be implemented as a portion of source device 101. As shown in FIG. 5, system 500 may include display engine 201, encoder 202, packetizer 203, and transport module 204 as discussed with respect to FIG. 2. Furthermore, as shown, system 500 may include a selective frame memory 503, a reference frame memory 504, an encoded frame memory 505, a packetized frame memory 506, and a packet buffer 507. As shown, in some examples, display engine 201, encoder 202, packetizer 203, packet buffer 507, and transport module 204 may be implemented in an IO domain 501 and selective frame memory 503, reference frame memory 504, encoded frame memory 505, and packetized frame memory 506 may be implemented in a main memory 502.

Selective frame memory 503, reference frame memory 504, encoded frame memory 505, and packetized frame memory 506 may be implemented in main memory 502 using any suitable technique or techniques. In some examples, one or more may be implemented as buffers such as selective frame memory 503, which may be implemented as a selective frame buffer. In some examples, one or more of selective frame memory 503, reference frame memory 504, encoded frame memory 505, and packetized frame memory 506 may be implemented as separate memory spaces of main memory 502.

As shown, display engine 201 may receive image data 205 and display engine may generate frame data for captured frames and/or selective updates for skipped frames. Such frame and/or selective update data (frame/SUs) 207 may be stored via selective frame memory 503. For example, for captured frames, display engine 201 may write scan lines or macroblock rows or the like to selective frame memory 503. In examples where a portion of a frame is captured (e.g., frames with selective media/non-media regions), only captured portions of the frame maybe stored via selective frame memory 503. In some examples, additional portions of the frame such as entire scan lines may also need to be stored to store the selective regions to selective frame memory 503. Similarly, selective updates may be selectively stored to selective frame memory 503 as scan lines or macroblock rows or the like. In other examples, selective updates may be stored locally at display engine 201 via a local cache or the like. Furthermore, as discussed, display engine 201 may generate meta-data associated with the selective update(s). Such meta-data may be stored locally at display engine 201 via a local cache or the like.

Also as shown, display engine 201 may receive a capture next frame indicator 511 from packetizer 203. Capture next frame indicator 511 may indicate whether or not a next frame is to be frame captured via display engine 201 or not. Capture next frame indicator 511 may be generated via packetizer 203 based on backpressure 514, which may indicate whether packets are backing up at packet buffer 507. If so, capture next frame indicator 511 may be set to no or skip such that a next frame may be skipped as discussed herein. If not, capture next frame indicator 511 may be set to yes or capture such that a next frame is captured, encoded, packetized, and transmitted as discussed herein. As shown, in some examples, capture next frame indicator 511 may be implemented. In other examples, a skip indicator such as skip indicator 206 as discussed herein may be implemented via system 500. Such a skip indicator may be generated via packetizer 203, a power management unit (not shown), or a thermal management unit (not shown). As shown, display engine 201 may generate a frame update indicator 508 to indicate a frame update is available for encoding via encoder 202. Frame update indicator 508 may include, for example, an indicator a frame is available for encoding and/or meta-data associated with selective updates for encoding with the frame.

Encoder 202 may receive from display engine 201 a frame update indicator 508 indicating a frame update has been provided. Based on frame update indicator 508, encoder 202 may retrieve or receive frame data and/or selective update data 207 from selective frame memory 503. As shown, encoder 202 may also retrieve or receive reference frame (ref frame) 509 from reference frame memory 504. Encoder 202 may encode frame data and/or selective update data 207 based in part on reference frame 509 to generate encoded frame data (enc. frame) 208. Encoder 202 may transmit encoded frame data 208 to encoded frame memory 505. For example, encoder 202 may encode frame data and/or selective update data 207 (e.g., encoding only frame data if no selective updates are included or integrating selective updates with frame data in the encoding if selective updates are included) based on reference frame 509 such that reference frame 509 may be used for reference based on motion estimation/compensation techniques or the like. In some examples, encode frame data and/or selective update data 207 may be encoded without reference to a reference frame. Encoder 202 may generate a new frame indicator 510 to indicate a new frame is available for packetization.

Packetizer 203 may receive new frame indicator 510 from encoder 202 and packetizer may, based on receiving new frame indicator 510, retrieve or receive encoded frame data 208 from encoded frame memory 505. Packetizer 203 may generate packets 512 based on encoded frame data 208 such that packets 512 include encoded frame data and any necessary overhead data for transmission. As shown, packetizer 203 may store packets 512 via packetized frame memory 506. Also as shown, packetizer 203 may generate new packets indicator 513 to indicate new packets are available for transmission. As shown, packetizer 203 may transmit new packets indicator 513 to packet buffer 507, which may, based on new packets indicator 513, retrieve or receive packets 512 from packetized frame memory 506. Packet buffer 507 may also receive other packets for transport (not shown). As shown, packet buffer 507 may also transmit or indicate backpressure 514 based on how many packets are in packet buffer 507 and a transmission rate of packets from packet buffer 507. As discussed, packetizer 203 may use backpressure 514 to generate capture next frame indicator 511. For example, packetizer 203 may use backpressure 514 to predict whether subsequent packets may be timely transmitted or whether there may be a likely delay. If there is a likely delay, capture next frame indicator 511 may be set to no or skip and, if not, next frame indicator 510 may be set to yes or capture. For example, capture next frame indicator 511 may be based on a tracking and prediction of when previously packetized frame data will be transmitted via transport module 204. Such prediction may be generated via feedback from the transport (e.g., backpressure 514 or the like) and may include a prediction of residual and rate or the like of transmission. Furthermore, capture next frame indicator 511 and/or skip indicator 206 may signal skipping until there is a good probability (e.g., greater than a threshold) of transmission. As discussed herein, such signaling may be region selective in some examples when such skipping is performed on portions of frames such as non-media content portions of frames.

As shown, transport module 204 may retrieve or receive data packets 515, which may include packets 512 and other packets for transmission. For example, transport module 204 may generate wireless transmission 210 based on data packets 515 and transport module 204 may transmit wireless transmission 210. Although illustrated with respect to wireless transmission, transport module 204 may transmit data packets 515 via a wired transmission in some implementations.

As discussed, the skipping and selective update capture and encode techniques discussed herein may be implemented for entire frames or for portions of frames based on selective region processing techniques.

Figures 6, 7:
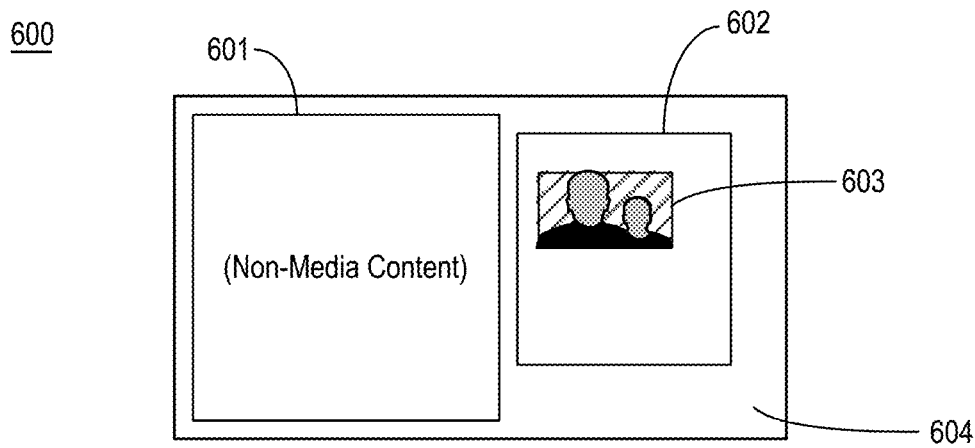
FIG. 6 is an illustrative diagram of an example frame having a media content portion and a non-media content portion.
FIG. 7 is a flow diagram illustrating an example process for encoding image content for transmission and display via a remote device.

FIG. 6 is an illustrative diagram of an example frame 600 having a media content portion and a non-media content portion, arranged in accordance with at least some implementations of the present disclosure. As shown in FIG. 6, frame 600 may include a non-media content portion 601, a media content window 602, a media content portion 603, and a background 604. For example, non-media content portion 601 may include a window or computing frame or the like having non-media content (e.g., interactive content, productivity application content, gaming content, or web browsing content, or the like) as discussed herein. Furthermore, media content window 602 may be a window or computing frame or the like having a media content portion 603. As illustrated, in some examples, media content portion 603 may be within a media content window such as media content window 602. In other examples, media content portion 603 may be its own window or another region of frame 600. As shown, frame 600 may include a background 604 over which non-media content portion 601, media content window 602, and media content portion 603 are overlaid. In other examples, no background may be provided. In the illustrated examples, non-media content portion 601, media content window 602, and media content portion 603 do not overlap. In other examples, such elements of frame 600 may overlap.

The techniques and systems discussed herein may be applied to entire frames or they may be applied to regions or portions (e.g., with selective region processing) of a frame such as frame 600. For example, skipping techniques as described may be implemented to non-media regions such as non-media content portion 601, background 604, and/or non-media portions of media content window 602 (e.g., portions of media content window 602 not overlaid by media content portion 603). In some examples, media content portions such as media content portion 603 may be processed using standard techniques such that frames are not skipped. Such processing may provide for substantially constant frame rates as is advantageous in media applications and any associated latency may be resolved using a jitter buffer or the like. For example, media content portions may be processed without skipping but with a buffer to maintain a constant frame rate while non-media content portions may be processed with skipping to provide low latency while still maintaining a semblance of a constant frame rate.

The regions of frame 600 such as non-media content portion 601, media content window 602, media content portion 603, background 604 or the like may be indicated via meta-data or other indicators. For example, meta-data may be provided such that regions of frame 600 may be tagged as either media (or constant frame rate) and non-media (or low latency or productivity) content. Regions tagged as media or constant frame rate may be processed without frame skipping and regions tagged as non-media or low latency or productivity content may be processed with frame skipping as discussed herein. For example, media or constant frame rate content may be continually processed while changes to non-media or low latency or productivity content may be accumulated via selective updates and provided via integration into the encode of a later non-skipped frame.

For example, as discussed with respect to the display pipeline of FIGS. 2 and 5, non-media or low latency or productivity content (e.g., non-media portions of frames) may be processed as discussed and media or constant frame rate (e.g. media portions of frames) may be processed without use of skip indicator 206 or capture next frame indicator 511. Such media portions may be captured via display engine 201, encoded via encoder 202, packetized via packetizer 203 and transmitted via transport module 204 without reference to skip processing for example. In such cases a non-media portion of a frame may be skipped or deferred (e.g., via selective update(s)) while a media portion of the frame may be processed. In an example, a capture, encode, and packetization of media content portion 603 may be performed prior to the integration of selective updates associated with non-media content portion 601 via the encode of a subsequent non-skip non-media portion (e.g., of a subsequent frame). In delay situations, the media content portion 603 transmission may be delayed and performed as transport module 204 is available. Such delay may be handled via a jitter buffer as discussed such that an acceptable lag is provided between the source device and the target device.

FIG. 7 is a flow diagram illustrating an example process 700 for encoding image content for transmission and display via a remote device, arranged in accordance with at least some implementations of the present disclosure. Process 700 may include one or more operations 701-703 as illustrated in FIG. 7. Process 700 may form at least part of a display pipeline process. By way of non-limiting example, process 700 may form at least part of a display process as undertaken by devices 101 or 1000 or systems 200, 500, 800, or 900 as discussed herein. Furthermore, process 700 will be described herein with reference to system 800 of FIG. 8.

Figure 8:
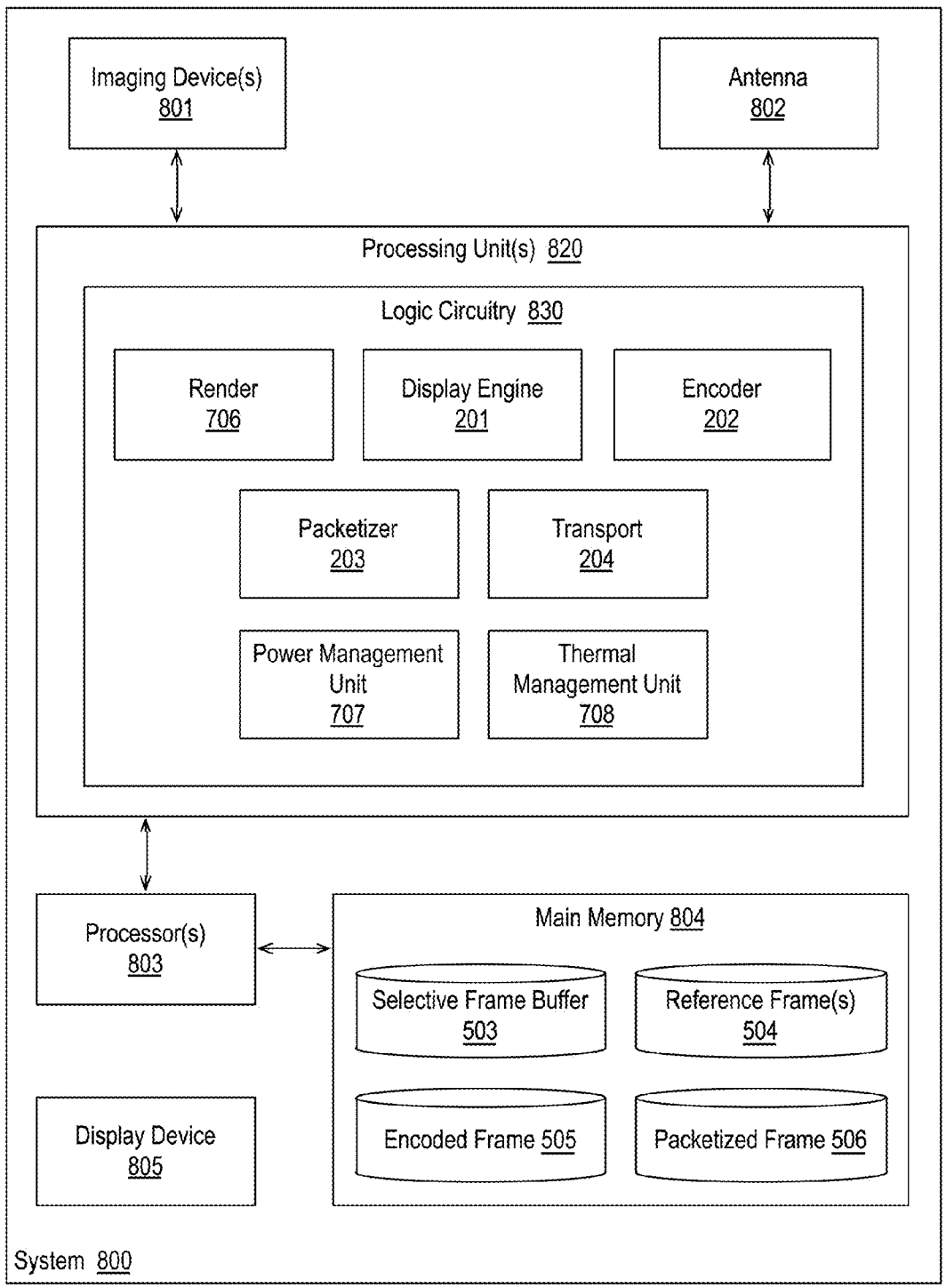
FIG. 8 is an illustrative diagram of an example system.

FIG. 8 is an illustrative diagram of an example system 800, arranged in accordance with at least some implementations of the present disclosure. For example, system 800 may be a display pipeline system of device 101, a portion thereof, or the like. As shown in FIG. 8, system 800 may include one or more imaging devices 801, an antenna 802, one or more processing units 820 including logic circuitry 830, one or more processors 803, a main memory 804, and a display device 805. Furthermore, logic circuitry 830 may include or implement a render module 706, display engine 201, encoder 202, packetizer 203, transport module 204, a power management unit 707, and a thermal management unit 708, or portions thereof. As illustrated, imaging device(s) 801, antenna 802, processing unit(s) 820, logic circuitry 830, render module 706, display engine 201, encoder 202, packetizer 203, transport module 204, power management unit 707, and thermal management unit 708 may be capable of communication with one another.

As shown, in some examples, system 800 may include antenna 802. Antenna 802 may be configured to transmit or receive a wireless transmission including packetized encoded frame data, for example. Further, in some examples, system 800 may include display device 805. Display device 805 may be configured to present image data such as image data generated via local display operations 302. As shown, in some example, logic circuitry 830 may be implemented via processing unit(s) 820. Processing unit(s) 820 may include application-specific integrated circuit (ASIC) logic, graphics processor(s), general purpose processor(s), or the like. System 800 also may include optional processor(s) 803, which may similarly include application-specific integrated circuit (ASIC) logic, graphics processor(s), general purpose processor(s), or the like. In some examples, logic circuitry 830 or portions thereof may be implemented via hardware, image processing or coding dedicated hardware, or the like, and processor(s) 803 may implement general purpose software, operating systems, or the like, via, for example, a multi-core central processing unit (CPU). In addition, main memory 804 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, main memory 804 may be implemented by cache memory. In some examples, logic circuitry 830 may access main memory 804 (for implementation of a frame buffer for example). In other examples, logic circuitry 830 and/or processing unit(s) 820 may include memory stores (e.g., a cache or the like) for the implementation of a frame buffer or the like. For example, main memory 804 may store any image content data such as image data 205, skip indicator 206, frame data, selective updates, frame and/or selective updates data 207, encoded frame data 208, data packets 209, wireless transmission 210, reference frame 509, packets 512, frame update indicator 508, new frame indicator 510, new packets indicator 513, backpressure 514, data packets 515, or any other data utilized or generated as discussed herein.

As shown, one or more of render module 706, display engine 201, encoder 202, packetizer 203, transport module 204, power management unit 707, and thermal management unit 708 may be implemented via logic circuitry 830. In some examples, one or more of render module 706, display engine 201, encoder 202, packetizer 203, transport module 204, power management unit 707, and thermal management unit 708 may be implemented via a software stack. In some examples, render module 706, display engine 201, encoder 202, packetizer 203, transport module 204, power management unit 707, and thermal management unit 708 may be implemented via the same processing unit(s) 820 and, in other examples, one or more of render module 706, display engine 201, encoder 202, packetizer 203, transport module 204, power management unit 707, and thermal management unit 708 may be implemented via different processing unit(s) 820.

Returning to discussion of FIG. 7, process 700 may begin at operation 701, "Skip one or more of Render, Capture, Encode, Packetize, or Transmission of a non-Media Content Portion of a Frame based on a Skip Indicator", where one or more of a render, a capture, an encode, a packetization, or a transmission may be skipped for a non-media content portion of a frame based on a skip indicator. For example, the skip indicator may include any skip indicator discussed herein such as a transmission delay indicator (e.g., issued via packetizer 203), a bandwidth limitation indicator (e.g., issued via packetizer 203), a power savings indicator (e.g., issued via power management unit 707), or a thermal reduction indicator (e.g., issued via thermal management unit 708).

As discussed, such skipping may include any combination of skipped operations. For example, only encode, packetization, and transmission may be skipped for frames that are frame captured in some examples, In other examples, frame capture, encode, packetization, and transmission may be skipped. And, in yet other examples, render, frame capture, encode, packetization, and transmission may be skipped. For example, a render operation may be skipped via render module 706, a frame capture operation may be skipped via display engine 201, an encode operation may be skipped via encoder 202, a packetization operation may be skipped via packetizer 203, and/or a transmission operation may be skipped via transport module 204 in response to the skip indicator.

Furthermore, such skipping may be performed for an entire frame or for only a region or portion of a frame. In some examples, such skipping may be performed for a non-media content frame. In some examples, such skipping may be performed for a non-media content portion of a frame. Such non-media content may include interactive content, productivity application content, gaming content, web browsing content, or the like.

Processing may continue at operation 702, "Capture one or more Selective Updates for the non-Media Content Portion of the Frame", where at least one selective update may be captured for the non-media content portion of the frame. For example, selective updates may be captured via display engine 201 as implemented via logic circuitry 830 of processing unit(s) 820. For example, display engine 201 may receive a skip indicator (e.g., skip indicator 206 or a negative capture next frame indicator 511 or the like) and capture at least one selective update for the frame (e.g. the frame being skipped).

Furthermore, meta-data associated with the selective updates may also be captured. For example, the meta-data may include an indicator associated with the current frame or a position of the selective update within the first frame or the like. In some examples, such meta-data may be captured via display engine 201 as implemented via logic circuitry 830 of processing unit(s) 820.

Also, skipping may be performed and selective updates (and associated meta-data) may be captured for one or more frames or frame portions. For example, operations 701 and 702 may be repeated for any number of frames prior to processing continuing at operation 703. For example, second selective update(s) may be captured for a second skipped frame or a portion thereof. In some examples, the second skipped frame or frame portion may be a non-media content frame or a non-media content portion of a frame. Such second frame may be subsequent to the previously skipped frame for example.

Processing may continue at operation 703, "Integrate the Selective Update(s) into an Encode of a non-Media Content Portion of a Subsequent Frame", where the selective update(s) may be integrated into an encode of a subsequent frame such as a first non-skipped frame. For example, encoder 202 as implemented via logic circuitry 830 of processing unit(s) 820 may encode the subsequent frame or frame portion and integrate the selective update(s) (for one or more frames or frame portions) into the encode. In some examples, the discussed meta-data may provide information to encoder 202 for integrating such selective update(s).

In some examples, prior to the discussed encode, the subsequent frame or portion thereof may have been captured (e.g., frame captured) via display engine 201. The encoded frame or portion thereof including the integrated selective update(s) may subsequently be packetized and transmitted to a remote device. For example, the encoded frame or portion thereof including the integrated selective update(s) may be packetized by packetizer 203 as implemented via logic circuitry 830 of processing unit(s) 820 and/or the packets may be transmitted by transport module 204 as implemented via logic circuitry 830 of processing unit(s) 820. For example, may implement antenna 802 for wireless transmission or other network interface circuitry for wired transmission.

The operations of process 700 may be repeated any number of times either in series or in parallel for any number of image content frames such as non-media image content frames or portions or regions of image content frames such as non-media portions of frames as indicated via meta-data or indicators as discussed herein.

Various components of the systems described herein may be implemented in software, firmware, and/or hardware and/or any combination thereof. For example, various components of devices 101 or 1000 or systems 200, 500, 800, or 900 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of devices 101 or 1000 or systems 200, 500, 800, or 900, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 9:
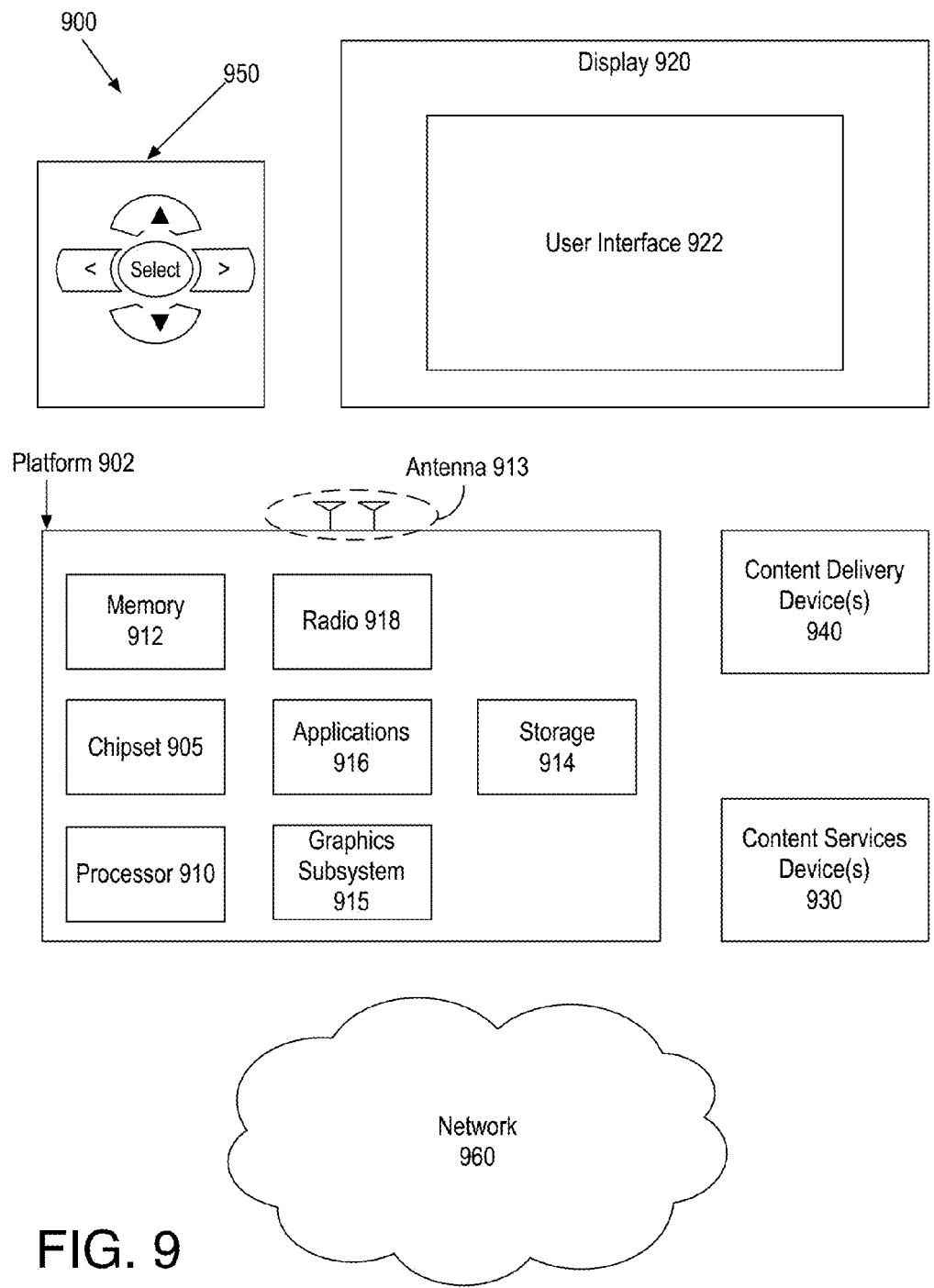
FIG. 9 is an illustrative diagram of an example system.

FIG. 9 is an illustrative diagram of an example system 900, arranged in accordance with at least some implementations of the present disclosure. In various implementations, system 900 may be a mobile device although system 900 is not limited to this context. For example, system 900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 900 includes a platform 902 coupled to a display 920. Platform 902 may receive content from a content device such as content services device(s) 930 or content delivery device(s) 940 or other similar content sources. A navigation controller 950 including one or more navigation features may be used to interact with, for example, platform 902 and/or display 920. Each of these components is described in greater detail below.

In various implementations, platform 902 may include any combination of a chipset 905, processor 910, memory 912, antenna 913, storage 914, graphics subsystem 915, applications 916 and/or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 910 may be dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 914 may include technology to increase the storage performance enhanced protection for valuable digital media when multiple hard drives are included, for example.

Graphics subsystem 915 may perform processing of images such as still or video for display. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, DisplayPort, wireless HDMI, and/or wireless HD compliant techniques. Graphics subsystem 915 may be integrated into processor 910 or chipset 905. In some implementations, graphics subsystem 915 may be a stand-alone device communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In various implementations, display 920 may include any television type monitor or display. Display 920 may include, for example, a computer display screen, touch screen display, video monitor, television-like device, and/or a television. Display 920 may be digital and/or analog. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In various implementations, content services device(s) 930 may include a cable television box, personal computer, network, telephone, Internet enabled devices or appliance capable of delivering digital information and/or content, and any other similar device capable of uni-directionally or bi-directionally communicating content between content providers and platform 902 and/display 920, via network 960 or directly. It will be appreciated that the content may be communicated uni-directionally and/or bi-directionally to and from any one of the components in system 900 and a content provider via network 960. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of controller 950 may be used to interact with user interface 922, for example. In various embodiments, navigation controller 950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 950 may be replicated on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922, for example. In various embodiments, controller 950 may not be a separate component but may be integrated into platform 902 and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 even when the platform is turned "off" In addition, chipset 905 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various embodiments, platform 902 and display 920 may be an integrated unit. Display 920 and content service device(s) 930 may be integrated, or display 920 and content delivery device(s) 940 may be integrated, for example. These examples are not meant to limit the present disclosure.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail (email) message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
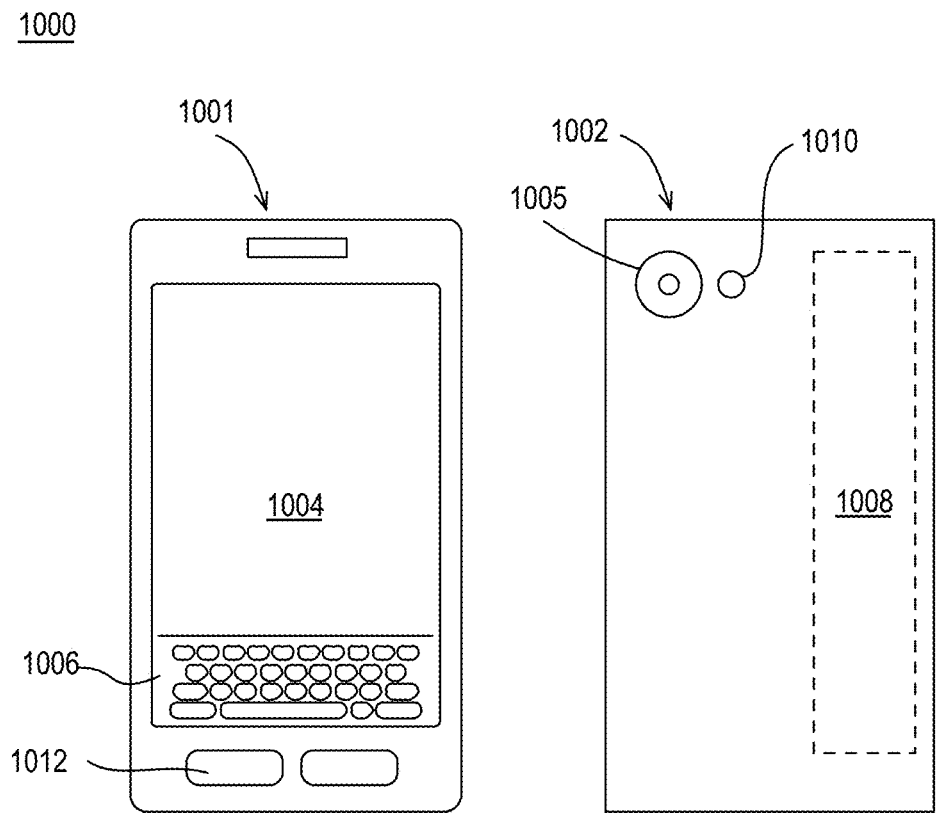
FIG. 10 illustrates an example small form factor device, all arranged in accordance with at least some implementations of the present disclosure.

As described above, system 900 may be embodied in varying physical styles or form factors. FIG. 10 illustrates an example small form factor device 1000, arranged in accordance with at least some implementations of the present disclosure. In some examples, system 900 may be implemented via device 1000. In other examples, systems 200, 500, or 800 may be implemented via device 1000. In various embodiments, for example, device 1000 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, device 1000 may include a housing with a front 1001 and a back 1002. Device 1000 includes a display 1004, an input/output (IO) device 1006, and an integrated antenna 1008. Device 1000 also may include navigation features 1012. IO device 1006 may include any suitable I/O device for entering information into a mobile computing device. Examples for I/O device 1006 may include an alphanumeric keyboard, a numeric keypad, a touch pad, input keys, buttons, switches, microphones, speakers, voice recognition device and software, and so forth. Information also may be entered into device 1000 by way of microphone (not shown), or may be digitized by a voice recognition device. As shown, device 1000 may include a camera 1005 (e.g., including a lens, an aperture, and an imaging sensor) and a flash 1010 integrated into back 1002 (or elsewhere) of device 1000. In other examples, camera 1005 and flash 1010 may be integrated into front 1001 of device 1000 or both front and back cameras may be provided. Camera 1005 and flash 1010 may be components of a camera module to originate image data processed into streaming video that is output to display 1004 and/or communicated remotely from device 1000 via antenna 1008 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a computer-implemented method for encoding image content for transmission and display via a remote device comprises skipping at least encode, packetization, and transmission of at least a non-media content portion of a first frame based on a skip indicator, capturing at least one selective update for the non-media content portion of the first frame, and integrating the selective update into an encode of at least a non-media content portion of a second frame, wherein the second frame is subsequent to the first frame.

Further to the first embodiments, the method further comprises skipping frame capture of the non-media content portion of the first frame based on the skip indicator.

Further to the first embodiments, the method further comprises capturing meta-data associated with the selective update, the meta-data comprising at least one of an indicator associated with the current frame or a position of the selective update within the first frame.

Further to the first embodiments, the method further comprises skipping frame capture of the non-media content portion of the first frame based on the skip indicator and/or capturing meta-data associated with the selective update, the meta-data comprising at least one of an indicator associated with the current frame or a position of the selective update within the first frame.

Further to the first embodiments, the method further comprises skipping at least encode, packetization, and transmission of at least a non-media content portion of a third frame, wherein the third frame is subsequent to the first frame and prior to the second frame, capturing at least one second selective update for the non-media content portion of the third frame, and integrating the second selective update of the third frame into the encode of the non-media content portion of the second frame.

Further to the first embodiments, the skip indicator comprises at least one of a transmission delay indicator, a bandwidth limitation indicator, a power savings indicator, or a thermal reduction indicator.

Further to the first embodiments, the method further comprises skipping render and capture of the non-media content portion of the first frame based on the skip indicator.

Further to the first embodiments, the first frame comprises a media content portion and the method further comprises capturing, encoding, and packetizing the media content portion of the first frame prior to the encode of the non-media content portion of the second frame.

Further to the first embodiments, a transmission of packets associated with a third frame prior to the first frame occurs after a scheduled capture of the first frame.

Further to the first embodiments, the non-media content comprises at least one of interactive content, productivity application content, or web browsing content.

Further to the first embodiments, a transmission of packets associated with a third frame prior to the first frame occurs after a scheduled capture of the first frame, and/or the non-media content comprises at least one of interactive content, productivity application content, or web browsing content Further to the first embodiments, the method further comprises capturing the second frame, packetizing the encode of the non-media content portion of the second frame, and transmitting the packetized encoded second frame to the remote device for presentment to a user.

In one or more second embodiments, a system for encoding video content for wireless transmission comprises a memory configured to store image content data and a processing unit coupled to the memory, wherein the processing unit comprises a display engine to receive a skip indicator for a first frame, to capture at least one selective update for at least a non-media content portion of the first frame and an encoder to integrate the selective update into an encode of at least a non-media content portion of a second frame, wherein the second frame is subsequent to the first frame.

Further to the second embodiments, the display engine is to skip frame capture of the first frame based on the skip indicator.

Further to the second embodiments, the display engine is to capture meta-data associated with the selective update, the meta-data comprising at least one of an indicator associated with the current frame or a position of the selective update within the first frame.

Further to the second embodiments, the display engine is to skip frame capture of the first frame based on the skip indicator and to capture meta-data associated with the selective update, the meta-data comprising at least one of an indicator associated with the current frame or a position of the selective update within the first frame.

Further to the second embodiments, the display engine is to capture at least one second selective update for at least a non-media content portion of a third frame, wherein the third frame is subsequent to the first frame and prior to the second frame, and wherein the encoder is to integrate the second selective update into the encode of the non-media content portion of the second frame.

Further to the second embodiments, the skip indicator comprises at least one of a transmission delay indicator, a bandwidth limitation indicator, a power savings indicator, or a thermal reduction indicator.

Further to the second embodiments, the display engine is to capture at least one second selective update for at least a non-media content portion of a third frame, wherein the third frame is subsequent to the first frame and prior to the second frame, and wherein the encoder is to integrate the second selective update into the encode of the non-media content portion of the second frame, and/or the skip indicator comprises at least one of a transmission delay indicator, a bandwidth limitation indicator, a power savings indicator, or a thermal reduction indicator.

Further to the second embodiments, the system further comprises a render module to skip a render of the first frame based on the skip indicator.

Further to the second embodiments, the first frame comprises a media content portion, and wherein the display engine is to capture the media content portion and the encoder is to encode the media content portion prior to the encode of the non-media content portion of the second frame.

Further to the second embodiments, the system further comprises a render module to skip a render of the first frame based on the skip indicator and/or the first frame comprises a media content portion, and wherein the display engine is to capture the media content portion and the encoder is to encode the media content portion prior to the encode of the non-media content portion of the second frame.

Further to the second embodiments, the system further comprises a transport module to transmit packets associated with a third frame prior to the first frame after a scheduled capture of the first frame.

Further to the second embodiments, the non-media content comprises at least one of interactive content, productivity application content, or web browsing content.

Further to the second embodiments, the system further comprises a packetizer to packetize the encode of the non-media content portion of the second frame and a transport module to transmit the packetized encoded frame to a remote device for presentment to a user.

Further to the second embodiments, the system further comprises at least one of a power management unit or a thermal management unit to issue the skip indicator.

In one or more third embodiments, a system for encoding video content for wireless transmission comprises means for skipping at least encode, packetization, and transmission of at least a non-media content portion of a first frame based on a skip indicator, means for capturing at least one selective update for the non-media content portion of the first frame, and means for integrating the selective update into an encode of at least a non-media content portion of a second frame, wherein the second frame is subsequent to the first frame.

Further to the third embodiments, the system further comprises means for skipping frame capture of the non-media content portion of the first frame based on the skip indicator.

Further to the third embodiments, the system further comprises means for capturing meta-data associated with the selective update, the meta-data comprising at least one of an indicator associated with the current frame or a position of the selective update within the first frame.

Further to the third embodiments, the system further comprises means for skipping at least encode, packetization, and transmission of at least a non-media content portion of a third frame, wherein the third frame is subsequent to the first frame and prior to the second frame, means for capturing at least one second selective update for the non-media content portion of the third frame, and means for integrating the second selective update of the third frame into the encode of the non-media content portion of the second frame.

Further to the third embodiments, the skip indicator comprises at least one of a transmission delay indicator, a bandwidth limitation indicator, a power savings indicator, or a thermal reduction indicator.

Further to the third embodiments, the system further comprises means for skipping render and capture of the non-media content portion of the first frame based on the skip indicator.

Further to the third embodiments, the first frame comprises a media content portion and the system further comprises means for capturing, encoding, and packetizing the media content portion of the first frame prior to the encode of the non-media content portion of the second frame.

Further to the third embodiments, a transmission of packets associated with a third frame prior to the first frame occurs after a scheduled capture of the first frame.

Further to the third embodiments, the non-media content comprises at least one of interactive content, productivity application content, or web browsing content.

Further to the third embodiments, the system further comprises means for capturing the second frame, means for packetizing the encode of the non-media content portion of the second frame, and means for transmitting the packetized encoded second frame to the remote device for presentment to a user.

In one or more fourth embodiments, at least one machine readable medium comprises a plurality of instructions that in response to being executed on a computing device, cause the computing device to encode image content for transmission and display via a remote device by skipping at least encode, packetization, and transmission of at least a non-media content portion of a first frame based on a skip indicator, capturing at least one selective update for the non-media content portion of the first frame, and integrating the selective update into an encode of at least a non-media content portion of a second frame, wherein the second frame is subsequent to the first frame.

Further to the fourth embodiments, the machine readable medium further comprises instructions that cause the computing device to encode image content for transmission and display via the remote device by skipping frame capture of the non-media content portion of the first frame based on the skip indicator and capturing meta-data associated with the selective update, the meta-data comprising at least one of an indicator associated with the current frame or a position of the selective update within the first frame.

Further to the fourth embodiments, the skip indicator comprises at least one of a transmission delay indicator, a bandwidth limitation indicator, a power savings indicator, or a thermal reduction indicator.

Further to the fourth embodiments, the machine readable medium further comprises instructions that cause the computing device to encode image content for transmission and display via the remote device by skipping render and capture of the non-media content portion of the first frame based on the skip indicator.

Further to the fourth embodiments, the machine readable medium further comprises instructions that cause the computing device to encode image content for transmission and display via the remote device by capturing, encoding, and packetizing a media content portion of the first frame prior to the encode of the non-media content portion of the second frame.

Further to the fourth embodiments, the non-media content comprises at least one of interactive content, productivity application content, or web browsing content.

Further to the fourth embodiments, the machine readable medium further comprises instructions that cause the computing device to encode image content for transmission and display via the remote device by capturing the second frame, packetizing the encode of the non-media content portion of the second frame, and transmitting the packetized encoded frame to the remote device for presentment to a user.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for encoding image content for transmission and display via a remote device comprising:
   skipping at least encode, packetization, and transmission of at least a non-media content portion of a first frame of a sequence of frames and based on a skip indicator, and the first frame comprising at least one selective update of the image content comprising a change in pixel color or pixel brightness or both of the non-media content portion that changed from a previous frame, wherein media content comprises one or more pictures or videos without providing the ability of interaction with a user on an area forming the media content while the media is being displayed;
   capturing the at least one selective update for the non-media content portion of the first frame; and
   integrating the selective update into an encode of at least a non-media content portion of a second frame, wherein the second frame is subsequent to the first frame within the sequence of frames.

2. The method of claim 1, further comprising:
   initially skipping frame capture of the non-media content portion of the first frame based on the skip indicator.

3. The method of claim 1, further comprising:
   capturing meta-data associated with the selective update, the meta-data comprising at least one of an indicator associated with the current frame or a position of the selective update within the first frame.

4. The method of claim 1, further comprising:
   skipping at least encode, packetization, and transmission of at least a non-media content portion of a third frame, wherein the third frame is subsequent to the first frame and prior to the second frame;
   capturing at least one second selective update for the non-media content portion of the third frame; and
   integrating the second selective update of the third frame into the encode of the non-media content portion of the second frame.

5. The method of claim 1, wherein the skip indicator comprises at least one of a transmission delay indicator, a bandwidth limitation indicator, a power savings indicator, or a thermal reduction indicator.

6. The method of claim 1, further comprising:
   skipping render and capture of the non-media content portion of the first frame based on the skip indicator.

7. The method of claim 1, wherein the first frame comprises a media content portion, the method further comprising:
   capturing, encoding, and packetizing the media content portion of the first frame prior to the encode of the non-media content portion of the second frame.

8. The method of claim 1, wherein a transmission of packets associated with a third frame prior to the first frame occurs after a scheduled capture of the first frame.

9. The method of claim 1, wherein the non-media content comprises at least one of interactive content, productivity application content, or web browsing content.

10. The method of claim 1, further comprising:
    capturing the second frame;
    packetizing the encode of the non-media content portion of the second frame; and
    transmitting the packetized encoded second frame to the remote device for presentment to a user.

11. A system for encoding video content for wireless transmission, comprising:
    a memory configured to store image content data; and
    a processing unit coupled to the memory, wherein the processing unit comprises:
       a display engine to
          receive a skip indicator for a first frame of a sequence of frames and comprising at least one selective update of the image content comprising a change in pixel color or pixel brightness or both of at least one non-media content portion of the first frame and changed from a previous frame, wherein media content comprises one or more pictures or videos without providing the ability of interaction with a user on an area forming the media content while the media is being displayed, and
          capture the at least one selective update for the at least one non-media content portion of the first frame; and
       an encoder to integrate the selective update into an encode of at least a non-media content portion of a second frame, wherein the second frame is subsequent to the first frame in the sequence of frames.

12. The system of claim 11, wherein the display engine is to skip frame capture of the first frame based on the skip indicator and to capture meta-data associated with the selective update, the meta-data comprising at least one of an indicator associated with the current frame or a position of the selective update within the first frame.

13. The system of claim 11, wherein the display engine is to capture at least one second selective update for at least a non-media content portion of a third frame, wherein the third frame is subsequent to the first frame and prior to the second frame, and wherein the encoder is to integrate the second selective update into the encode of the non-media content portion of the second frame.

14. The system of claim 11, wherein the skip indicator comprises at least one of a transmission delay indicator, a bandwidth limitation indicator, a power savings indicator, or a thermal reduction indicator.

15. The system of claim 11, further comprising:
    a render module to skip a render of the first frame based on the skip indicator.

16. The system of claim 11, wherein the first frame comprises a media content portion, and wherein the display engine is to capture the media content portion and the encoder is to encode the media content portion prior to the encode of the non-media content portion of the second frame.

17. The system of claim 11, further comprising:
a packetizer to packetize the encode of the non-media content portion of the second frame; and
a transport module to transmit the packetized encoded frame to a remote device for presentment to a user.

18. The system of claim 11, further comprising:
at least one of a power management unit or a thermal management unit to issue the skip indicator.

19. At least one non-transitory machine readable medium comprising a plurality of instructions that in response to being executed on a computing device, cause the computing device to encode image content for transmission and display via a remote device by:
skipping at least encode, packetization, and transmission of at least a non-media content portion of a first frame in a sequence of frames and based on a skip indicator, wherein the at least a non-media content portion of the first frame has at least one selective update of the image content comprising a change in pixel color or pixel brightness or both from a previous frame, wherein media content comprises one or more pictures or videos without providing the ability of interaction with a user on an area forming the media content while the media is being displayed;
capturing the at least one selective update of the non-media content portion of the first frame; and
integrating the selective update into an encode of at least a non-media content portion of a second frame, wherein the second frame is subsequent to the first frame in the sequence of frames.

20. The machine readable medium of claim 19, further comprising instructions that cause the computing device to encode image content for transmission and display via the remote device by:
initially skipping frame capture of the non-media content portion of the first frame based on the skip indicator; and
capturing meta-data associated with the selective update, the meta-data comprising at least one of an indicator associated with the current frame or a position of the selective update within the first frame.

21. The machine readable medium of claim 19, wherein the skip indicator comprises at least one of a transmission delay indicator, a bandwidth limitation indicator, a power savings indicator, or a thermal reduction indicator.

22. The machine readable medium of claim 19, further comprising instructions that cause the computing device to encode image content for transmission and display via the remote device by:
skipping render and capture of the non-media content portion of the first frame based on the skip indicator.

23. The machine readable medium of claim 19, further comprising instructions that cause the computing device to encode image content for transmission and display via the remote device by:
capturing, encoding, and packetizing a media content portion of the first frame prior to the encode of the non-media content portion of the second frame.

24. The machine readable medium of claim 19, wherein the non-media content comprises at least one of interactive content, productivity application content, or web browsing content.

25. The machine readable medium of claim 19, further comprising instructions that cause the computing device to encode image content for transmission and display via the remote device by:
capturing the second frame;
packetizing the encode of the non-media content portion of the second frame; and
transmitting the packetized encoded frame to the remote device for presentment to a user.

* * * * *